UNITED STATES PATENT OFFICE.

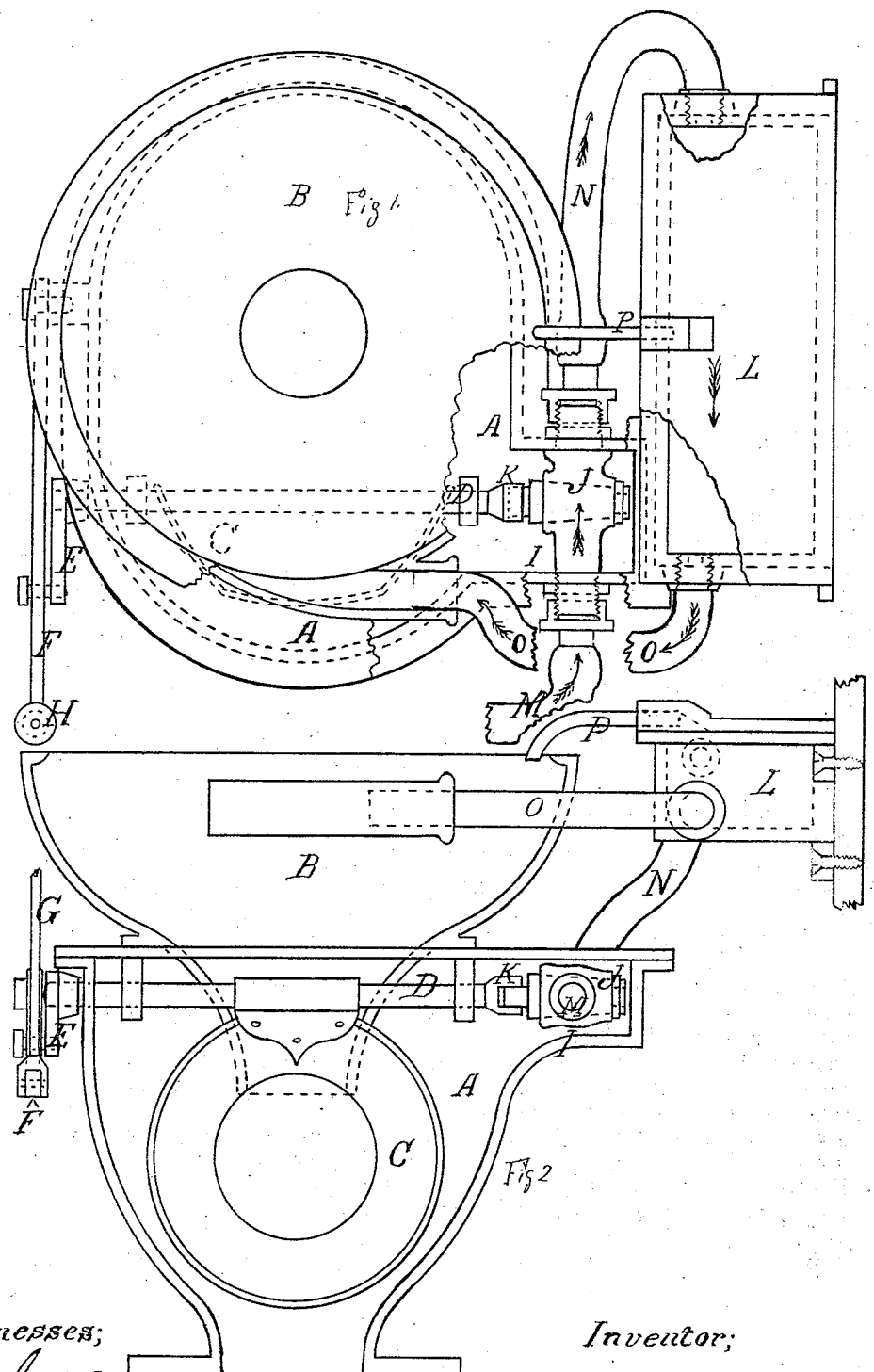

JOHN JONES, OF READING, PENNSYLVANIA.

IMPROVEMENT IN WATER-CLOSETS.

Specification forming part of Letters Patent No. 153,197, dated July 21, 1874; application filed May 14, 1874.

*To all whom it may concern:*

Be it known that I, JOHN JONES, of the city of Reading, county of Berks, State of Pennsylvania, have invented a new and useful Improvement in Water-Closets, to be known as the "Reading Water-Closet," the accompanying drawing—Figure 1, a plan view, Fig. 2 a vertical section—being part of this specification.

The object of my invention is to do away with the contingent dependence of all water-closets that operate in part by springs, weights, floats, &c., to cut off and regulate the flow, and to place both the cutting off and the reserve supply for the pan as positively under the control of the operator as the letting on the water.

The general construction of the closet is about the same as those in ordinary use—an iron bowl, A, a china basin, B, and filth-pan C. This pan is firmly attached to the rod D and crank E, and is let down and raised to its place again by the lever (of the second order) F, when operated on by the rod G attached to the hand-knob H. The first improvement consists of a projection of the iron bowl A, as shown at I, with the stop-cock J, so inclosed that any accidental leakage will run off harmless in the waste-pipe. This stop-cock is turned by the key K on the end of the rod D. The second improvement is the small reservoir L that reserves sufficient water to fill the pan after the supply is cut off.

When in use, the lever F is raised by the knob H and rod G, and turns the crank E and rod D ninety degrees, letting down the pan C, emptying the filth, and at the same time turning on the water through the stop-cock J, as shown in the drawing. When the stop-cock is opened the water passes from the pipe M attached to the main, through the stop-cock J and pipe N, almost instantly filling the little reservoir L, from whence it gushes through the pipe O, washing out the basin. The water that escapes through the vent-pipe P is also utilized by being turned in the basin. When the knob H is let down, the pan C is raised again to its place, and the same direct action that opened the stop-cock J again closes it, when the water in the reservoir L flows through the pipe O, filling the pan, the small pipe P giving the vent.

I do not claim the cutting off the water by means of springs, weights, or any contingent power; but What I do claim is—

1. The projection I, of the lower bowl A, for inclosing the supply-cock J, so that all accidental leakage may trickle off harmlessly through the waste-pipe, as described.

2. The combination of the small reservoir L, having a vent, P, with the supply-cock J and basin B, substantially as and for the purpose set forth.

JOHN JONES.

Witnesses:
JAMES LORD,
J. H. STERNBERGH.